US012602618B2

(12) United States Patent
Im et al.

(10) Patent No.: US 12,602,618 B2
(45) Date of Patent: Apr. 14, 2026

(54) ARTIFICIAL VISION PARAMETER LEARNING AND AUTOMATING METHOD FOR IMPROVING VISUAL PROSTHETIC SYSTEMS

(71) Applicant: KOREA INSTITUTE OF SCIENCE AND TECHNOLOGY, Seoul (KR)

(72) Inventors: Maesoon Im, Seoul (KR); Hyeonhee Roh, Seoul (KR); Na Min An, Seoul (KR); Jae Hun Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 703 days.

(21) Appl. No.: 18/075,555

(22) Filed: Dec. 6, 2022

(65) Prior Publication Data
US 2023/0177396 A1 Jun. 8, 2023

(30) Foreign Application Priority Data
Dec. 6, 2021 (KR) ........................ 10-2021-0172619

(51) Int. Cl.
*G06N 20/00* (2019.01)
(52) U.S. Cl.
CPC .................................... *G06N 20/00* (2019.01)
(58) Field of Classification Search
None
See application file for complete search history.

(56) References Cited

U.S. PATENT DOCUMENTS

| | | | | |
|---|---|---|---|---|
| 11,633,169 B2 * | 4/2023 | Yoo | ........................ | G16H 50/20 |
| | | | | 600/408 |
| 2022/0358716 A1 * | 11/2022 | Zhang | ........................ | G06T 7/60 |
| 2023/0040091 A1 * | 2/2023 | Habili | .................. | G06V 10/462 |
| 2023/0253104 A1 * | 8/2023 | Serruya | .................. | A61B 5/369 |
| | | | | 623/25 |

* cited by examiner

*Primary Examiner* — Darryl V Dottin
(74) *Attorney, Agent, or Firm* — NSIP Law

(57) ABSTRACT

In artificial vision parameter automating method, the system includes a sensory module, a communication module, a database, an image processing module, a learning module and a automating and storing module. The sensory module is configured to take images. The communication module is configured to be send the data obtained from the sensory module to the database. The database is configured to store the images received from the communication module. The image processing module is configured to convert a selected image from the database into a low-resolution phosphene image, to generate test images with various artificial vision parameters. The learning module is configured to extract important features from high-resolution training images, and to build various machine learning models competent at identifying visual stimuli from low-resolution phosphene images. The automating and storing module is configured to automatically select and store primary test data, based on the learning in the learning module.

11 Claims, 20 Drawing Sheets
(7 of 20 Drawing Sheet(s) Filed in Color)

* The above sample image was not cropped.

$\begin{pmatrix} 16 \\ 16 \end{pmatrix}$

16 PIX      24 PIX      32 PIX      64 PIX      128 PIX $\begin{pmatrix} 16 \\ 4 \end{pmatrix}$ Face
- ● 19070231
- ■ 19070311
- ▲ 19070522
- ▼ 19071131
- ◆ 19071821
- ✶ 19072221
- ▶ 19072922
- ◀ 19080133
- ○ 19081421
- □ 19081632
- △ 19082032
- ▽ 19082131
- ◇ 19090222
- ☆ 19090631
- ▷ 19092521
- ◁ 19092711

Face
- ● 19070231
- ■ 19070311
- ▲ 19070522
- ▼ 19071131
- ◆ 19071821
- ✶ 19072221
- ▶ 19072922
- ◀ 19080133
- ○ 19081421
- □ 19081632
- △ 19082032
- ▽ 19082131
- ◇ 19090222
- ☆ 19090631
- ▷ 19092521
- ◁ 19092711

Face
- ● 19070231
- ■ 19070311
- ▲ 19070522
- ▼ 19071131
- ◆ 19071821
- ★ 19072221
- ▶ 19072922
- ◀ 19080133
- ○ 19081421
- □ 19081632
- △ 19082032
- ▽ 19082131
- ◇ 19090222
- ☆ 19090631
- ▷ 19092521
- ◁ 19092711

Face
- ● 19070231
- ■ 19070311
- ▲ 19070522
- ▼ 19071131
- ◆ 19071821
- ★ 19072221
- ▶ 19072922
- ◀ 19080133
- ○ 19081421
- □ 19081632
- △ 19082032
- ▽ 19082131
- ◇ 19090222
- ☆ 19090631
- ▷ 19092521
- ◁ 19092711

1

ARTIFICIAL VISION PARAMETER LEARNING AND AUTOMATING METHOD FOR IMPROVING VISUAL PROSTHETIC SYSTEMS

This application claims priority under 35 U.S.C. § 119 to Korean Patent Application No. 10-2021-0172619 filed on Dec. 6, 2021, the disclosure of which is incorporated by reference herein in its entirety.

BACKGROUND

1. Field of Disclosure

The present disclosure of invention relates to an artificial vision parameter automating method for improving visual prosthetic systems, and more specifically the present disclosure of invention relates to an artificial vision parameter automating method for improving visual prosthetic systems, capable of predicting clinical results of artificial vision devices to be implanted/wore by patients who have lost their sight due to retinal diseases, thereby replacing conventional human psychophysical experiments with less time and cost.

2. Description of Related Technology

There is no cure for retinal degenerative diseases such as retinitis pigmentosa and age-related macular degeneration, which cause vision loss. To date, microelectronic visual prosthetic devices are known as the only way to restore the eyesight. In the past, only psychophysical experiments on patients implanted with retinal prosthetic devices (Erickson-Davis et al., 2021, *PLOS ONE*) or cognitive ability tests on people with normal vision (Chang et al., 2012, *J. Neural Eng.*) were performed to estimate the quality of the low-resolution phosphene image that would be produced by visual prosthetic devices. In addition to microelectronic visual prosthetic systems, artificial vision can be implemented by inserting microelectrodes into the visual cortex, such as the Orion Visual Prosthesis System of Second Sight Medical Products, and by optically stimulating remaining retinal nerve cells after expressing artificial opsins (so called optogenetics) and/or photosensitive switches. All these approaches need to measure the visual perception ability of artificial vision users.

However, if psychophysical tests are performed every time with a visual prosthetic user or a normally-sighted person to measure or predict the performance of a visual prosthetic system, research and development would be time-consuming and costly. In this case, if a small number of human subjects are recruited to lower the cost for a large number of test data, the subjects will not only lose their concentration during the long tests but also solve problems relying on memory, which hinder achieving the original purpose of the psychophysical tests. Therefore, there is a limit to the number of data that can be examined per person, increasing the number of test subjects to be recruited, which increases costs and creates a vicious cycle. In this way, if human psychophysical experiments were to be conducted every time in an attempt to predict the performance of visual prosthetic systems, there is the time and cost limitations of recruiting a large number of subjects for a long period of time, getting approval by IRB (Institutional Review Board), and obtaining accurate and statistically significant results.

In addition to these time and cost limitations, when human psychophysical experiments were to be conducted, it induces difficulties such as the subject-to-subject variability, indicating that the degree of familiarity with the experiment varies from person to person, and the human subject has to maintain the posture during the whole experiment, inducing fatigue and drowsiness.

Furthermore, there are limitations in recruiting test subjects due to restrictions on gatherings such as a temporal rule ordering social distancing when an infectious disease, such as the recent COVID-19 pandemic spreads globally and lasts for a long time.

Related prior art is Korean Laid-open patent No. 10-2019-0097146.

SUMMARY

The present invention is developed to solve the above-mentioned problems of the related arts.

The present invention provides an artificial vision parameter automating method for improving visual prosthetic systems, capable of predicting clinical results of artificial devices to be implanted to patients blinded by diverse diseases with less time and cost than human psychophysical experiments, by replacing conventional human psychophysical experiments.

According to an example embodiment, the system includes a sensory module, a communication module, a database, an image processing module, a learning module and a automating and storing module. The sensory module is configured to take images. The communication module is configured to be communicated with the sensory module. The database is configured to store the images received from the communication module. The image processing module is configured to convert a selected image from the database into a low-resolution phosphene image, to generate test images with various artificial vision parameters. The learning module is configured to extract important features from the high-resolution training images, and to generate various machine learnings by learning to identify visual stimuli with a classifier based on the extracted features. The automating and storing module is configured to automatically select and store primary test data, based on the learning performed by the learning module.

In an example, the system may further include a test module configured to perform a human psychophysical experiment relatively small number of test images compared to number of test images provided to machine learnings.

In an example, the learning module may be configured to additionally learns based on the direct experiment in the test module, to develop the machine learning model for identifying the visual stimuli. The automating and storing module may be configured to automatically select and store primary test data, based on the performance of machine learning models from learning module.

In an example, the learning module may be configured to compare target class data that is difficult to process in the learning module and the test module, and then to develop the machine learning models based on the experimental results performed by the test module.

In an example, the learning module may be configured to update the parameters of the machine learning models by additionally learning only for a specific target class through data augmentation, when developing the machine learning models.

In an example, the learning module may be configured to calculate to draw a correlation deriving module and then to calculate Pearson's correlation coefficient at the results in the learning module and the test module, and to develop the machine learning models by additionally learning to predict parameters not experimented in the test module if the correlation coefficient of performances with human subjects is high enough.

In an example, the sensory module may include an image sensor or a camera device in visual prosthetic systems, for taking the images.

In an example, the image processing module may further include a background removing module configured to crop the image into a square shape centered on the target contour and to remove a background, a histogram equalization module configured to uniformly distributed pixel values of an unbalanced image in the image from which the background has been removed, a gray scaling module configured to divide grayscale levels for the uniformly distributed image, and a pixelation module configured to perform the nearest neighbor interpolation on the gray scaled image to enlarge the dimension of the image.

In an example, the learning module may include a training module configured to perform a test by providing results for each learning before performing an original learning. Cognitive ability to recognize visual stimuli of the learning module may be improved to a level similar to that of an actual person, through the training module.

In an example, the test module may be configured to test a human subject, to select the same image as the low-resolution phosphene images and the high-resolution multiple-choice options on the following screen, and to obtain information on whether or not the human subject correctly selected to visual stimuli from low-resolution phosphene images.

In an example, the learning module may be configured to control the number of layers and maximum filters and to design an optimal machine learning model at the low-resolution phosphene image.

In an example, the machine learning model may be any types of machine learning models such as CNN (Convolutional Neural Network) or RNN (Recurrent Neural Network).

According to another example embodiment, the system includes an image processing module, a learning module and a automating and storing module. The image processing module is configured to convert a selected image from the database into a low-resolution phosphene image, in order to generate test images with various artificial vision parameters. The learning module is configured to extract important features included in test images, and to build a novel machine learning model by learning to identify visual stimuli with a classifier based on extracted features. The automating and storing module is configured to automatically select and store primary test data, based on the performance of machine learning model across artificial vision parameters from the learning module.

According to still another example embodiment, the artificial vision parameter automating method performs an artificial vision parameter automating, using the system above.

According to the present example embodiments, instead of deriving results assessing the efficacy of visual prosthetic systems by only performing the conventional human psychophysical experiments, it is possible to quickly obtain estimated results of human subjects with machine learning models. Through the present example embodiments, crucial artificial vision parameters—the number of pixels (corresponding to the total number of electrodes in one device) and the grayscale levels (size of applied current; degree of brightness) are to be optimized in the automating and storing module Here, further artificial vision parameters may exist, though not explained in the present example embodiments.

In addition, in the present example embodiments, Korean facial images were used to measure the cognitive ability of human faces, but object detection task and so on may also be performed along with other types of visual stimuli (e.g., objects, animals, artificial backgrounds, and natural scenes).

In addition, in order to verify the performance of the machine learning model, only the primary test data is automatically selected among the large number of data tested by the automating method, and it may be tested on normally-sighted human subjects or patients with implanted visual prosthetic systems. Thus, whenever a machine learning model that has a high correlation with human cognitive ability results is newly developed, a small-scale human psychophysical experiment may be additionally performed so that efficient model verification may be possible.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
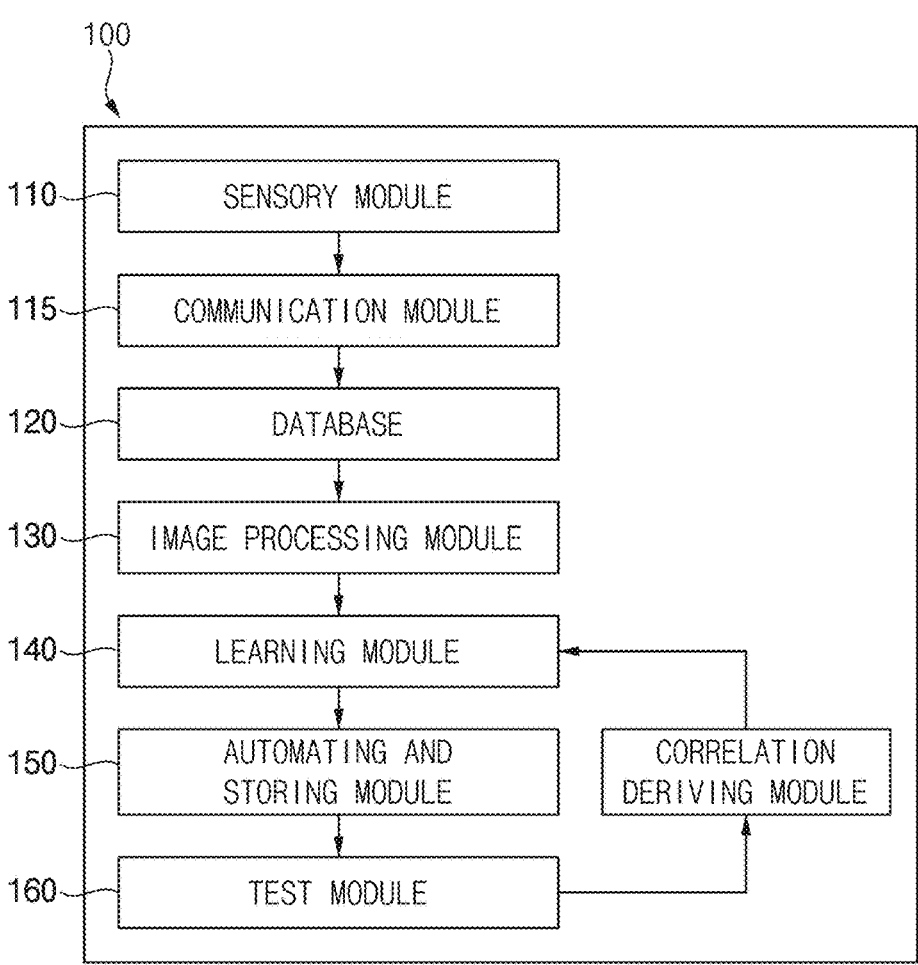
FIG. 1 is a block diagram illustrating an artificial vision parameter automating method for improving visual prosthetic systems according to an example embodiment of the present invention.

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention is described more fully hereinafter with reference to the accompanying drawings, in which embodiments of the invention are shown.

Figure 2A:
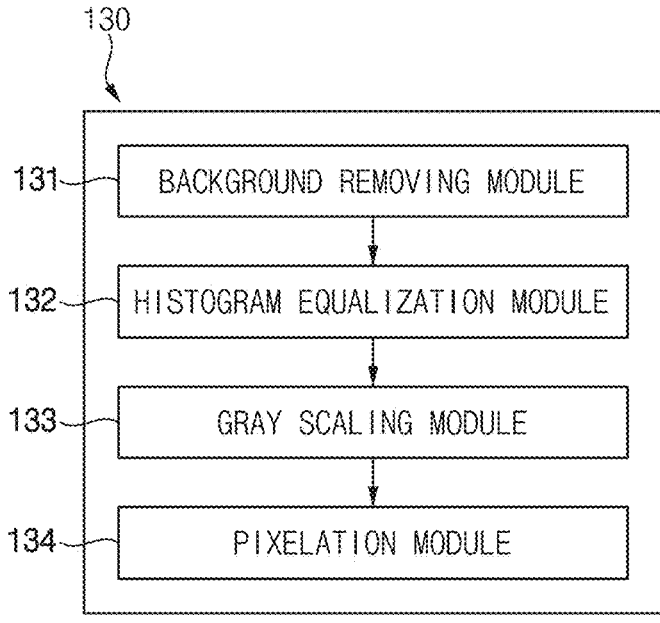
FIG. 2A is a block diagram illustrating an image processing module of FIG. 1.

FIG. 1 is a block diagram illustrating an artificial vision parameter automating method for improving visual prosthetic systems according to an example embodiment of the present invention. FIG. 2A is a block diagram illustrating an image processing module of FIG. 1 image processing module.

Referring to FIG. 1, the artificial vision parameter automating method 100 (hereinafter, the system) for improving visual prosthetic systems according to the present example embodiment, includes a sensory module 110, a communication module 115, a database 120, an image processing module 130, a learning module 140, an automating and storing module 150, and a test module 160. Here, the artificial vision parameter indicates resolutions, grayscale levels, or conditions (e.g., facial expression or visual angle) per image.

The sensory module 110 is configured to take images and the communication module 115 is configured to be communicated. That is, the communication module 115 is configured to be communicated with the sensory module. The database 120 is configured to store the images received from the communication module. In the present example embodiment, the facial image is explained as the visual stimuli, but not limited thereto. The sensory module 110 includes an image sensor or a camera device at visual prosthetic systems. The sensory module 110 takes the images for the facial and then transfers the taken images to the outside by a network communication. Here, the sensory module 110 may have a function of the networking or communicating, and alternatively additional network or communication module 115 as illustrated in FIG. 1 may be included to have the above function of the networking or communicating.

Here, the facial image taken by the sensory module 110 is what a human subject may visually perceive while interacting with the outside world with the visual prosthetic systems implanted in visual pathway areas (e.g., retina or the brain). Thus, the system 100 may be operated for various types of images such as objects, animal, artificial backgrounds, and natural scenes.

The database 120 is configured to store the images received from the sensory module 110 and the communication module 115.

In the present example embodiment, the main target class is the human face, considering the fact that a person wants to see the faces of their loved ones with artificial vision and one of the most important visual stimuli people encounter in life is human face (Turk et al., 1991, *J. Cog. Neurosci.*).

Figure 2B:
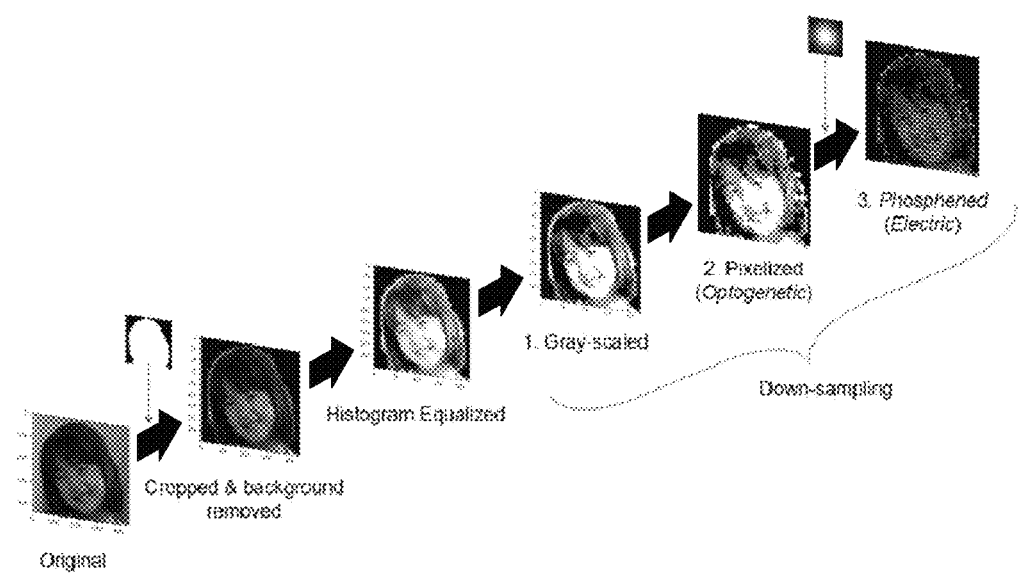
FIG. 2B is a flow chart illustrating a process of generating a low-resolution phosphene image in the image processing module of FIG. 1.

FIG. 2B is a flow chart illustrating a process of generating a low-resolution phosphene image in the image processing module of FIG. 1 in the image processing module.

Referring to FIG. 1, FIG. 2A and FIG. 2B, the image processing module 130 is configured to convert a selected image from the database into a low-resolution phosphene image, to generate test images with various artificial vision parameters.

The image processing module 130 is a processor performing an image processing process in the visual prosthetic systems, and the image processing module 130 performs the image processing downgrading a high-resolution image such as 128×128 pixels and 255 RGB levels (128 PIX_255RGB) to a low-resolution phosphene image.

Here, the image processing module 130 includes a background removing module 131, a histogram equalization module 132, a gray scaling module 133 and a pixelation module 134.

As illustrated in FIG. 2B, the background removing module 131 is configured to crop the facial image with a square and to remove a background.

Accordingly, the background in the facial image is processed to be black to reduce the background noise that might interfere with the facial recognition. Alternatively, in the example embodiments not for recognition of the faces, the background removing mentioned above may be omitted.

The histogram equalization module 132 is configured to uniformly distribute pixel values of in the background removed image.

The gray scaling module 133 is configured to divide grayscale levels for the image. For example, for 2 grayscale (GS) level, pixel values between 0 and less than 128 should be set to 0 (black), and values between 128 and less than 255 may be set to 255 (white).

Alternatively, in the case of 4 GS, 6 GS, or 8 GS, the grayscale division may be performed as follows. With dividing all the pixel values into n equal parts, the pixels corresponding to both sides are set to be 0 and 255, respectively, and the remaining pixels are set to be the midpoint values of the two points measured after the process of dividing grayscale levels.

The pixelation module 134 is configured to pixelize the high-resolution image and to enlarge the pixelated image with nearest neighbor interpolation.

The above image processing by the image processing module 130 means the processing of low-resolution phosphene images presented to a person implanted with visual prosthetic systems stimulated by an optogenetic approach. Here, other simulation types may include electric or ultrasound approach.

Figure 2C:
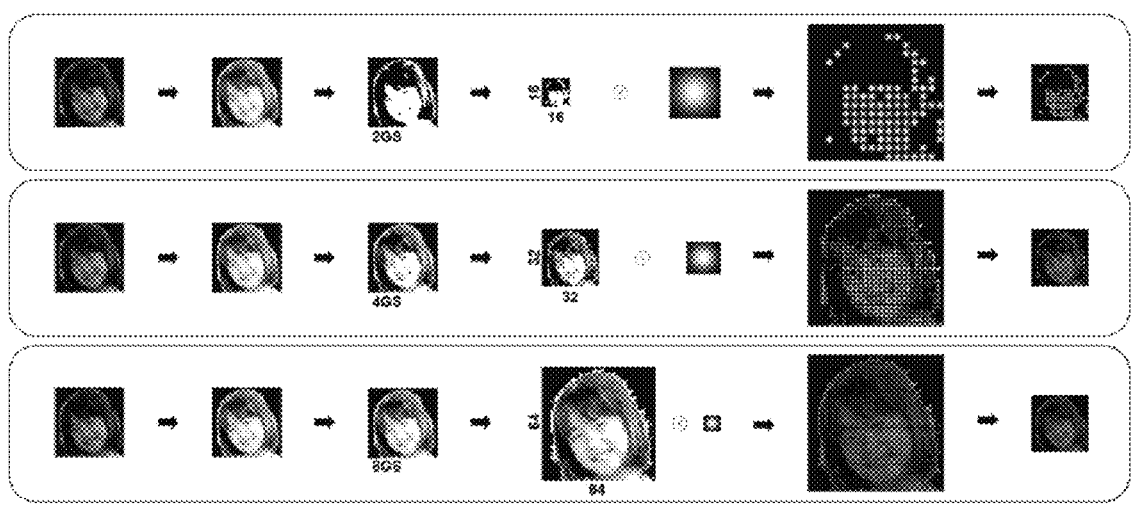
FIG. 2C is a flow chart for each sample parameter generating the corresponding low-resolution phosphene image in the image processing module of FIG. 1.

FIG. 2C is a flow chart of low-resolution phosphene image generation process for each sample artificial vision parameter in the image processing module of FIG. 1 in the image processing module. Here, the sample parameter may be, for example, 16×16 pixels and 2 gray scales (16 PIX_2 GS), 32×32 pixels and 4 gray scales (32 PIX_4 GS), 64×64 pixels and 8 gray scales (64 PIX_8 GS) and so on.

In addition, before resizing step from FIG. 2C, the size of the low-resolution phosphene image is calculated by dividing the size of pixelated image with the corresponding dimension of pixels (e.g., 128×128 pixels, or 128 PIX) and multiplying a constant value for all resolutions. This is to ensure that all the dimension of low-resolution phosphene images with various artificial vision parameters are the same. That is, it means to have the same dimension of one side for 16 PIX and 64 PIX, for example.

In addition, each kernel follows a normal distribution with a standard deviation of a value corresponding to ¼ of the dimension. Here, the standard deviation may be changed. The kernel is only needed for the electrically stimulation approach in which the assumption is that the stimulation is the strongest at the center and fades out in the peripheral region (Chen et al., 2009, *Vision Research*), and the phenomenon is similar to what patients implanted with retinal prosthetic devices had described in the past clinical study (Erickson-Davis et al., 2021, *PLOS ONE*).

Referring to FIG. 1 again, the learning module 140 extracts important features from original high-resolution images to be learned for the machine learning model, and a classifier is trained either separately or simultaneously with the extractor part to identify a visual stimulus from a low-resolution phosphene image.

Figure 3:
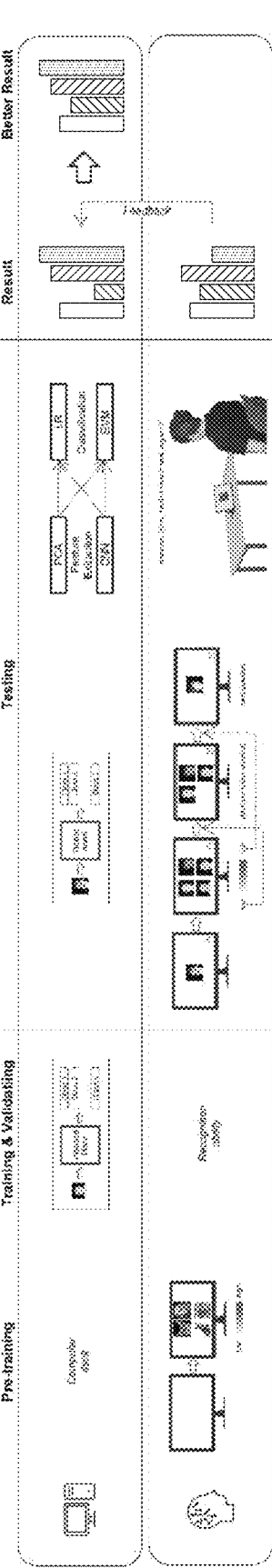
FIG. 3 is a structural diagram illustrating learning in the learning module of FIG. 1 and an experimental condition for both machine learning models and human subjects in the test module of FIG. 1.

FIG. 3 is a structural diagram illustrating learning in the learning module of FIG. 1 and an experimental condition for both machine learning models and human subjects in the test module of FIG. 1.

Referring to FIG. 3, the learning module 140 is configured and implemented so that the training procedure of machine learning models from the learning module 140 aligns with the conventional human psychophysical experimental procedure.

The learning module 140 includes a training module (not shown) and the trained machine learning model from the training module. Through the training module, the improved machine learning models from the learning module 140 may achieve better recognition accuracies in the test module 160.

Generally, since the learning module 140 that learns far exceeds human capabilities, the so-called pre-training module is omitted, and the test is performed directly through the training module.

Humans could recognize faces by default unless they suffer from facial recognition disorders since most people live with human faces every day from birth. Thus, in order to make this cognitive ability similar to those of humans, the learning module 140, including the training module, performs a test with high-resolution image data and then learns.

After the test is performed, learning module 140 extracts the important features included in the test images, and then the classifier is trained either separately or simultaneously with the extractor part is trained either separately or simultaneously with the extractor part to identify faces to create the machine learning based on the extracted features. Here, the generated machine learning is the model that classifies the low-resolution phosphene images generated by the image processing module 130 as the machine learning having finally determined parameters.

The automating and storing module 150 automatically select primary test data and stores the primary test data, based on the learned result.

The test module 160 is the module performing a direct experiment on human subjects, and the experiment is performed with a relatively small number of images.

In the test module 160, the experiment is performed on a human subject with respect to artificial vision parameters that overlap with the learned result for each artificial vision parameter in the learning module, among predetermined artificial vision parameters.

Figure 4:
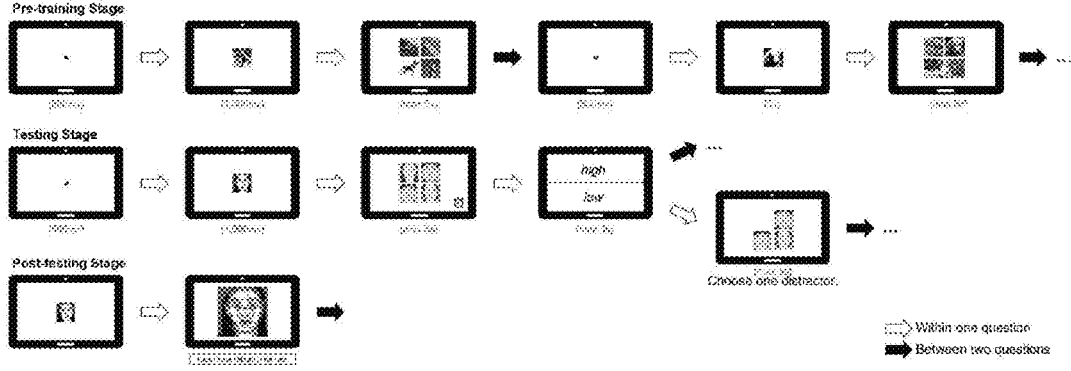
FIG. 4 is a structural diagram illustrating a detailed experimental condition of human psychophysical experiments in the test module of FIG. 1.

FIG. 4 is a structural diagram illustrating a detailed experimental condition of human psychophysical experiments in the test module of FIG. 1.

Referring to FIG. 4, unlike, in the conventional experiment, simply having to select the same facial from the high-resolution 4 options which is the following screen, for the low-resolution phosphene image test images, in the present example embodiment, the confidence scale is set to 0 and 1 and a screen for selecting 1 if the subject is confident about the answer selected and 0 if not sure is included additionally.

This is a similar application to human psychophysical experiments in which popular learning is always valuing all options (in addition to answer options) in the last step (the last layer in deep learning model). In other words, if the subjects are not confident of the initial answer, they are asked to select which option they are confused with among the remaining three facial options, excluding the selected one, as shown in FIG. 3.

Accordingly, in the present example embodiment, the test module 160 tests the human subject to select the same image as the low-resolution phosphene image and the high-resolution image option on the following screen, and at the same time, information on whether or not the human subject has confirmation of the selected result is obtained, so that the effect of improving or updating the machine learning of the learning module 140 may be improved, mentioned below.

Hereinafter, the real learned result using the learning module 140 and the experiment using the test module 160 are explained in detail referring to FIG. 5 through FIG. 17.

First, comparison explanation of the real learned result using the learning module 140 and the experiment using the test module 180, are as follows.

Figure 5:
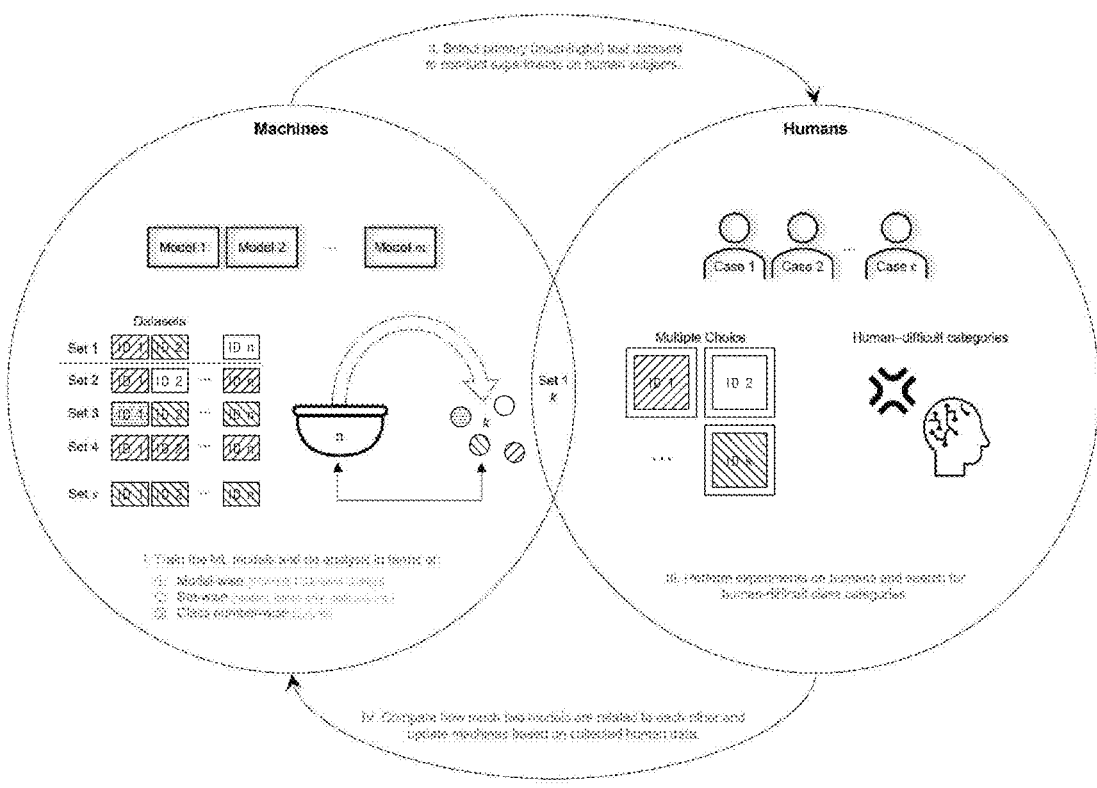
FIG. 5 is an ordered diagram illustrating steps of conditions for machine learning models in the learning module of FIG. 1 and the experimental conditions for human subjects in the test module of FIG. 1.

FIG. 5 is an ordered diagram illustrating steps of conditions for machine learning models in the learning module of FIG. 1 and the experimental conditions for human subjects in the test module of FIG. 1.

Referring to FIG. 5, the learning module 140 may enumerate the number of cases to automatically extract the artificial vision parameters to be tested, when performing a human psychophysical experiment to verify the result of the learning.

First, the learning module 140 makes possible m number of models: for example, principal component analysis and linear regression (PCA+LR), and/or convolutional neural network and linear regression (CNN+LR). This is to compare the highest value or average value among the machine learnings with the average value of the subjects in the human psychophysical experiment. Next, the data set is divided into sets of s. In the present example embodiment, each set has 16 facials, some sets randomly set the gender and age group, some sets fix the gender and set the age group randomly, and in other set, gender and age group are fixed, so that there are a total of 14 sets (set 1: random, set 2: female, set 3: male, set 4: female 20-30, set 5: female 40-50, set 6: male 20-30, set 7: male 40-50×2 times). This takes into account that people may have different performance depending on gender and age. For example, it may be a more difficult choice when the selection is made up of only women in their 30's than when it is made up of women and men, and people in their 20's and 40's. Finally, based on a set of n people, k people with a value less than n are extracted, and the model performance is measured by changing the number of facial classes. In the present example embodiment, k is set to 2 and 4, because many 4 options have been used during human psychophysical experiments, and 2 is the implementation of the most basic binary task.

Figure 6:
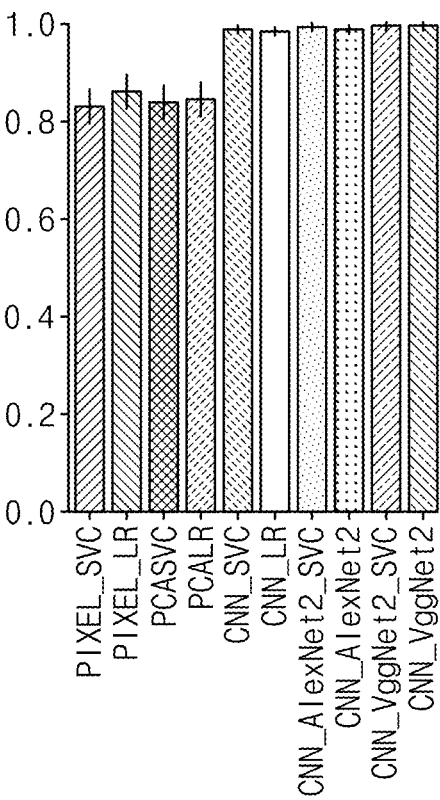
FIG. 6 is a graph showing results of high-resolution image recognition accuracy (hit rate in the drawings) for each machine learning model in the learning module of FIG. 1.

FIG. 6 is a graph showing results of high-resolution image recognition accuracy (hit rate in the drawings) for each machine learning model in the learning module of FIG. 1.

FIG. 6 shows the results of the test to check that recognition accuracy (hit rate in the drawings) of each model proposed in FIG. 5 is higher than a certain level (e.g., recognition accuracy (hit rate in the drawings) of 80% or higher) at high-resolution image.

Figure 7A:
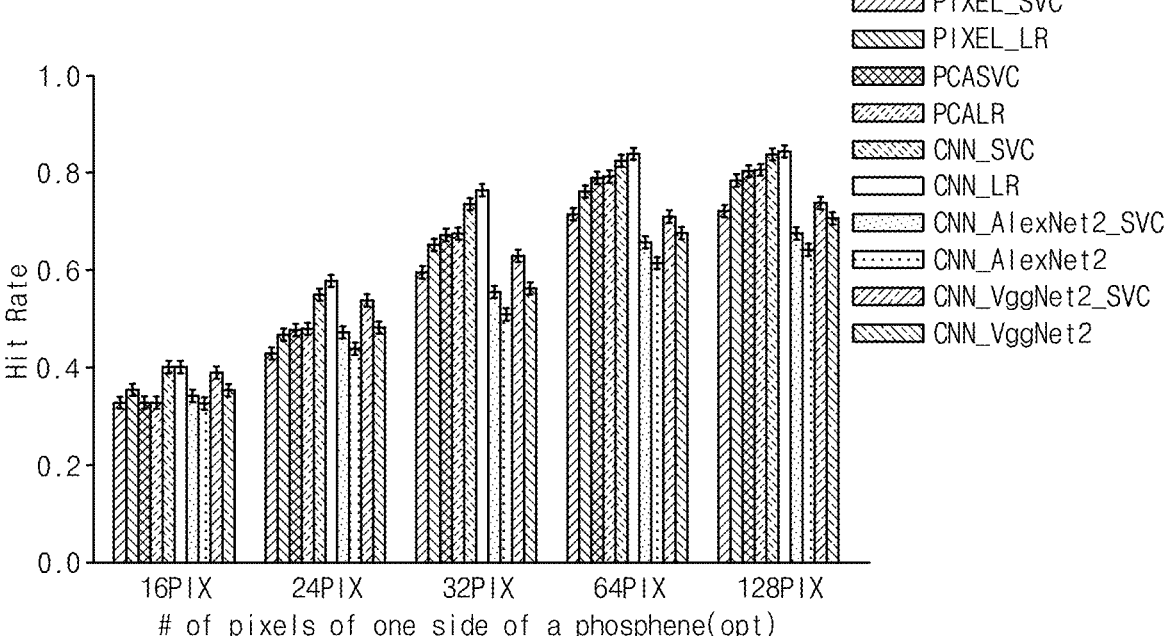
FIG. 7A and FIG. 7B are graphs showing results of recognition accuracy (hit rate in the drawings) with respect to various resolution and grayscale levels when stimulated by the optogenetic approach in which Gaussian blurred method is not applied at the final phosphene image, for each machine learning model in the learning module of FIG. 1.
Figure 7B:
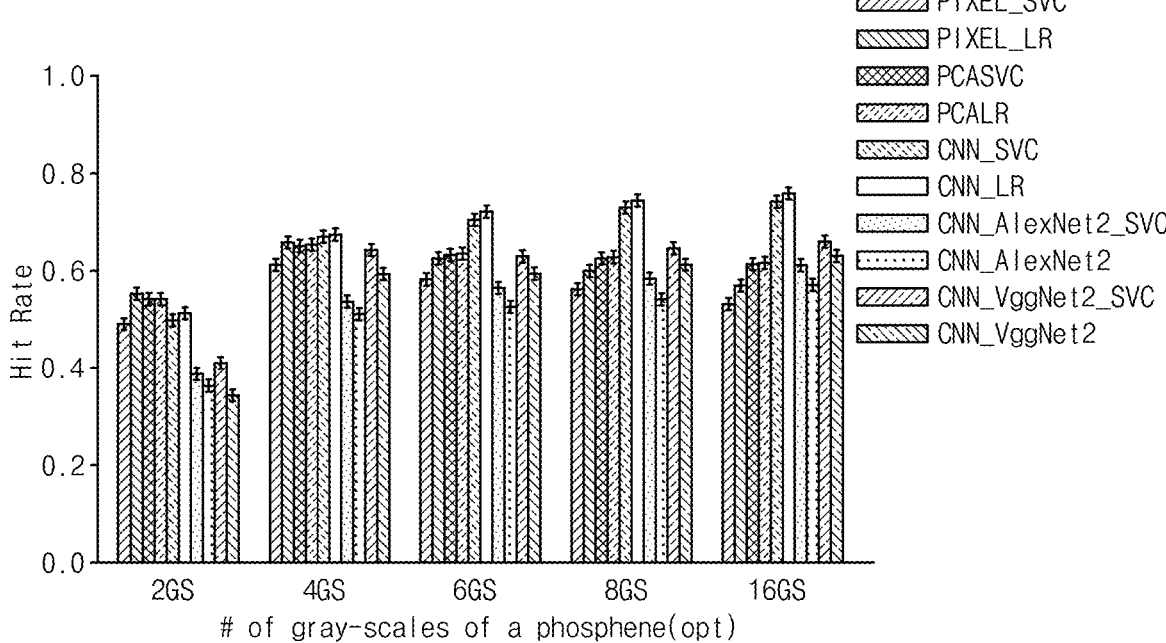
Figure 8A:
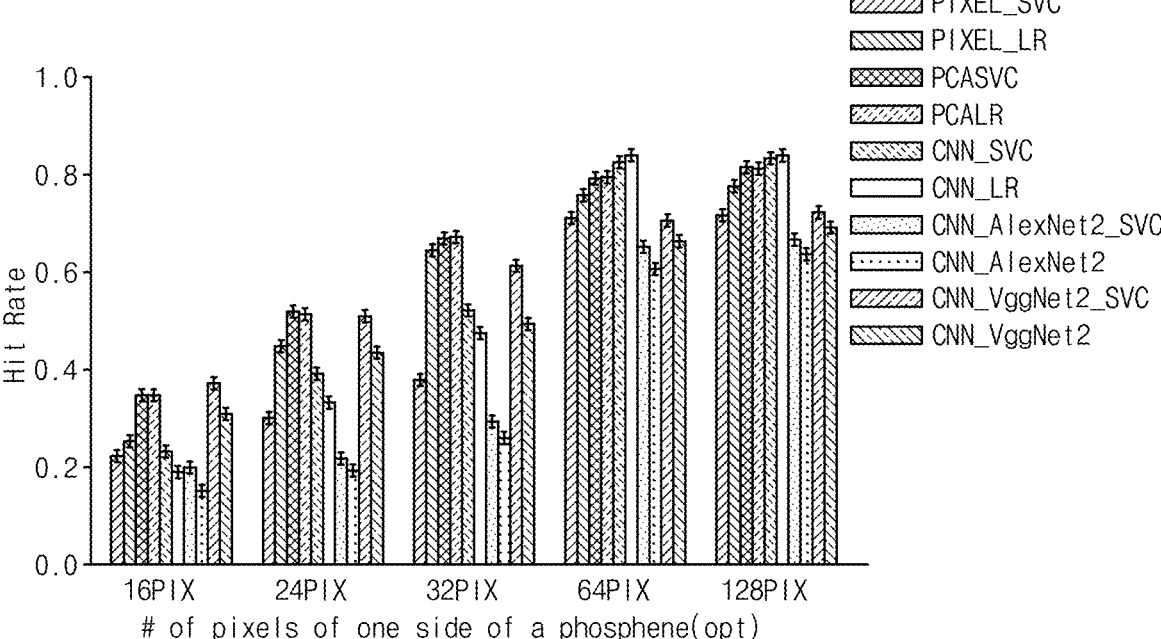
FIG. 8A and FIG. 8B are graphs showing results of recognition accuracy (hit rate in the drawings) with respect to various resolution and grayscale level parameters when stimulated by the electric approach in which Gaussian-blurred method is applied, for each machine learning model in the learning module of FIG. 1.
Figure 8B:
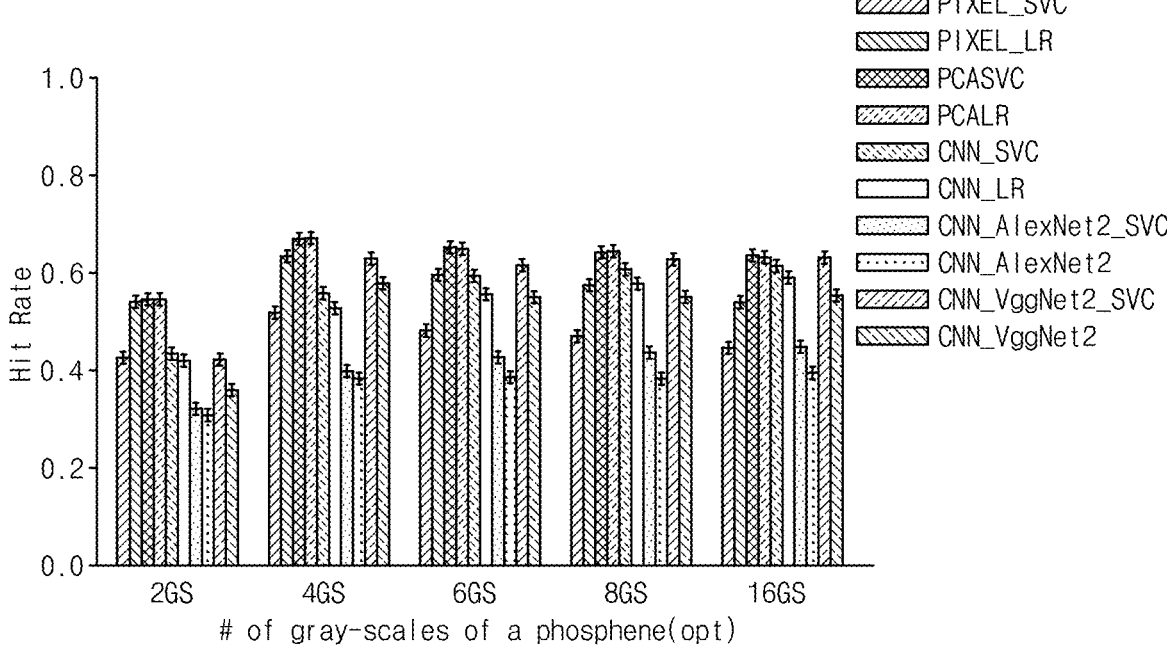

FIG. 7A and FIG. 7B are graphs showing results of recognition accuracy (hit rate in the drawings) with respect to various artificial vision parameter and grayscale level parameters when stimulated by the optogenetic approach in which Gaussian blurred method is not applied at the final phosphene image, for each machine learning model in the learning module of FIG. 1. FIG. 8A and FIG. 8B are graphs showing results of recognition accuracy (hit rate in the drawings) with respect to various resolution and grayscale level parameters when stimulated by the electric approach in which Gaussian-blurred method is applied, for each machine learning model in the learning module of FIG. 1.

FIG. 7A to FIG. 8B are the machine learning model trained with high-resolution image learning for each model and are test results of images generated when optogenetic stimulation and electrical stimulation are applied. As the artificial vision parameter (the number of pixels and the number of grayscales) varies, as in the previous study (Ho et al., 2019, *J. Vision*), the increasing tendency of facial recognition ability may be confirmed. In addition, it may be confirmed that the number of pixels has a greater effect on cognitive ability than the number of grayscales. This means that even if the value that may adjust the strength of the electrode to be distinguished increases, it has a negligible effect on the improvement of facial recognition skills.

On the other hand, as the number of pixels containing spatial information increased, there was a clearly increasing trend for all machine learning models as shown in FIGS. 8A and 8B, and there is no significant difference between 64 PIX and 128 PIX models in most of the models. That is, it may be confirmed that the performances had been saturated.

Even though AlexNet and VGG performed the highest at high-resolution test images, but they showed worse performance than other models in low-resolution phosphene images. Accordingly, some models remained robust across different distributions (e.g., from high-resolution image to low-resolution phosphene image).

For example, as illustrated in FIG. 6 to FIG. 8B, the total number of layers of CNN_SVC and CNN_LR is 6, and the maximum number of filters in a convolution block is 256, whereas the total number of layers of CNN_AlexNet2_SVC and CNN_AlexNet2 is 8, and the maximum number of filters in the convolution block is 384. The total number of layers of CNN_VGGNet2_SVC and CNN_AlexNet2 is 11, and the maximum number of filters in the convolution block is 512. In this way, a deep learning model, like CNN can be optimized by adjusting the number of layers and maximum filters.

That is, the learning module 140 may optimize the machine learning model by controlling the number of layers and maximum filters.

In addition, the optogenetic stimulation results in FIGS. 7A and 7B were generally higher than the electrical stimulation in FIG. 8A and FIG. 8B. This is because the electrical stimulation phosphene image has a Gaussian distribution for each kernel, whereas the optogenetic phosphene image has a uniform value for each pixel, so there is much less information for the latter.

In addition, the PCA (Principal Component Analysis) shows less robust results than the CNN. That is, the former shows similar results for both optogenetic stimulation and electrical stimulation, but the latter shows results that the performance of the electrical stimulation is inferior to the performance of the optogenetic stimulation. In the former, the principle in PCA projects the data to a lower dimension through the calculation of eigenvalues and eigenvectors from the covariance matrix of the data, and thus, when both the optogenetic image and the electrical stimulation image were projected to the lower dimension, it is highly likely that they had similar distribution. On the other hand, since CNN performs a convolution operation on each image, it may be seen that a lot f information is lost after the image is convolved with kernels.

Figure 9:
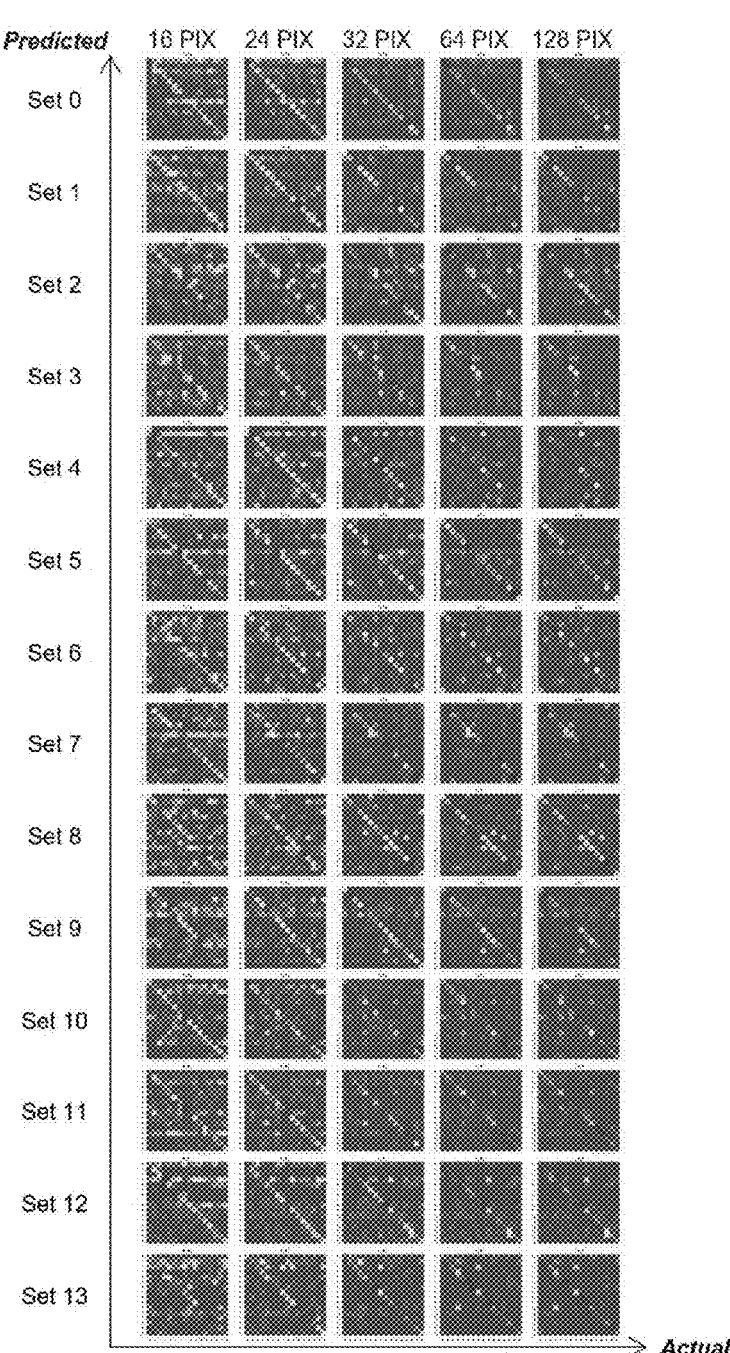
FIG. 9 is an image showing recognition accuracy (hit rate in the drawings) results with respect to artificial vision parameters when stimulated by the optogenetic approach in which for each set, the demographic distribution of the test data is different, performed by the learning module of FIG. 1.

FIG. 9 is an image showing recognition accuracy (hit rate in the drawings) results with respect to artificial vision parameters when stimulated by the optogenetic approach in which for each set, the demographic distribution of the test data is different, performed by the learning module of FIG. 1. FIG. 10A, FIG. 10B, FIG. 10C, FIG. 10D, FIG. 10E and FIG. 10F are performance correlation results between machine learning model with two different artificial neurons in the classification layer when optogenetic stimulation is applied, for each number of neurons (i.e., class size) performed by the learning module of FIG. 1. FIG. 11A and FIG. 11B are heatmap plots of performance correlations by type of machine learning models, sets, and class size performed in the learning module of FIG. 1.

Here, the figure on the very right in FIG. 11A summarizes the Pearson's correlation coefficient of the left portion in FIG. 8A and FIG. 8B, and the right side of FIG. 11B shows the Pearson's correlation coefficient on the right side of FIG. 8A and FIG. 8B.

First, referring to FIG. 11A and FIG. 11B, the correlation coefficient for each model is shown, and it may be seen that there is a certain degree of correlation coefficient among the models tested here (minimum 0.3, maximum 0.9). Also, for the same feature extractor (e.g., PCA), similar performances were shown for all images when using SVC and LR (e.g., PCASVC, PCALR: 0.99). Further, it may be confirmed that the correlation coefficient for each image is high between PCA and PIXEL and between two CNNs (e.g., CNN_LR, CNN_AlexNet2, and CNN_VGGNet2) (minimum: 0.59, maximum 0.99).

FIG. 9 shows the recognition accuracy (hit rate in the drawings) of each parameter (number of pixels) for each set. As confirmed through FIG. 9, no case was found in which a specific set was significantly better at classification than others.

In addition, even when the correlation coefficient is obtained, as shown in FIG. 11A, a high correlation coefficient (median value: 0.99) is shown for each set across various artificial vision parameters, and although there is more noise than each artificial vision parameter at an image level, a high correlation coefficient (median value: 0.9) is shown.

FIG. 10A to FIG. 10F shows results of recognition accuracy (hit rate in the drawings) and performance correlation for each parameter (number of pixels and number of gray scales) for each number of facial classes.

Referring to FIG. 10A to FIG. 10F, for the same model and one set, it may be seen that the performance is naturally higher when classifying 4 facial classes and 2 facial classes than when classifying 16 facial classes.

Figure 10A:
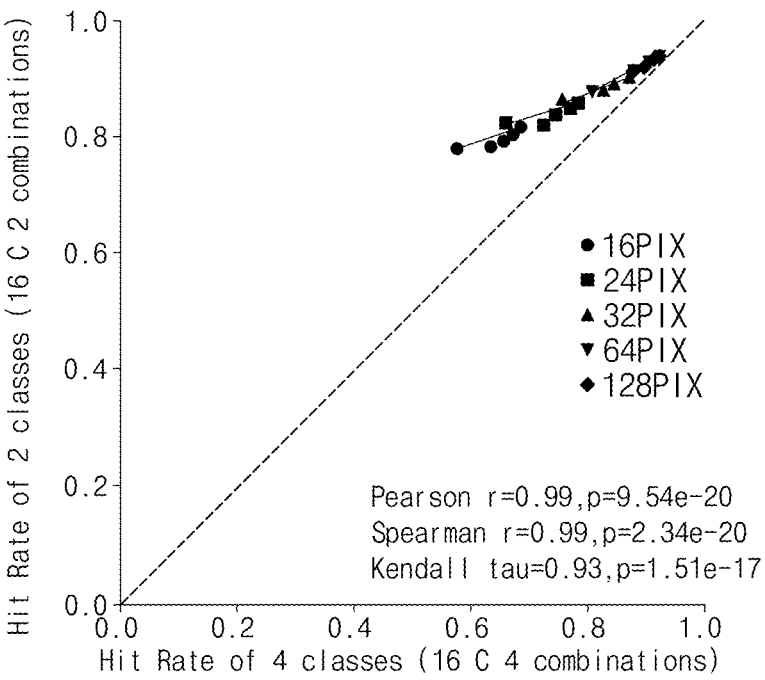
FIG. 10A, FIG. 10B, FIG. 10C, FIG. 10D, FIG. 10E and FIG. 10F are performance correlation results between machine learning model with two different number of artificial neurons (i.e., facial classes) in the classification layer when optogenetic stimulation is applied, for each number of neurons (i.e., facial class size) performed by the learning module of FIG. 1.
Figure 10B:
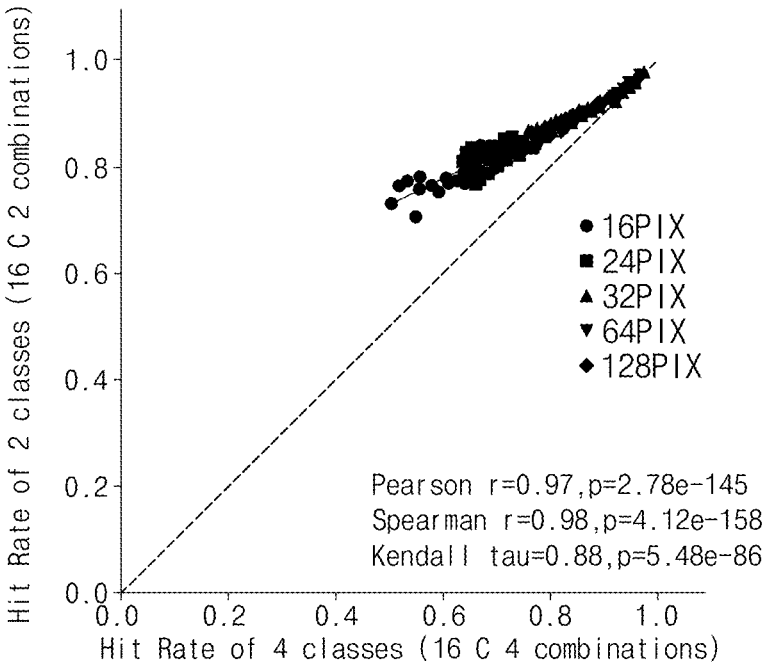
Figure 10C:
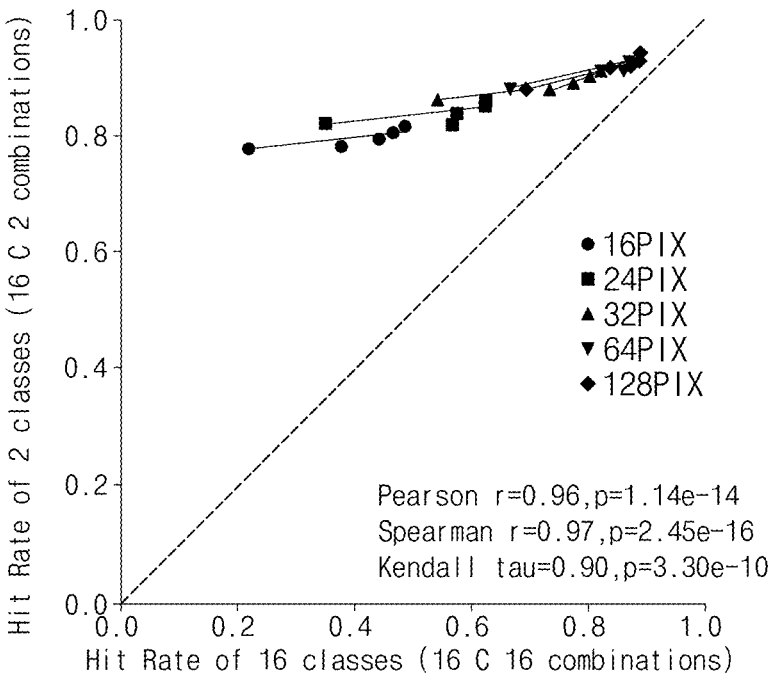
Figure 10D:
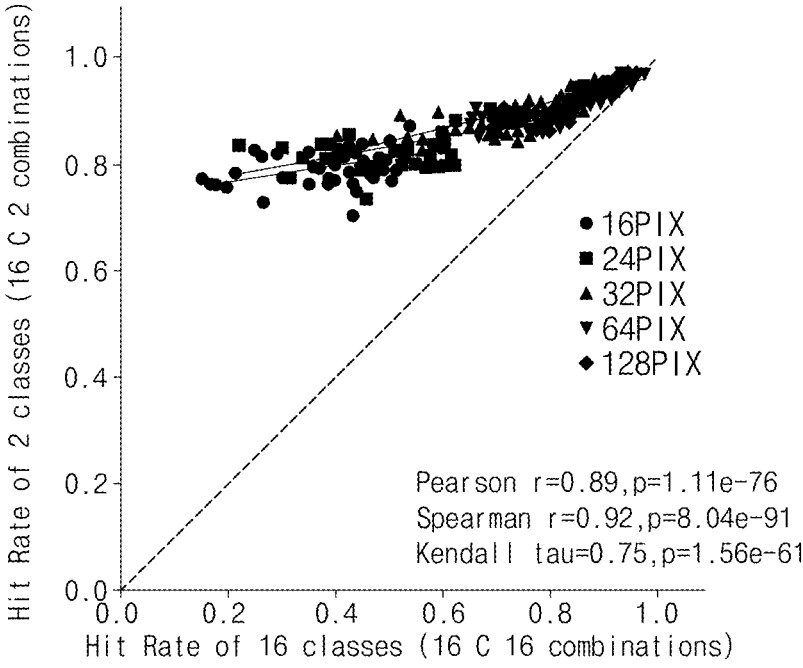
Figure 10E:
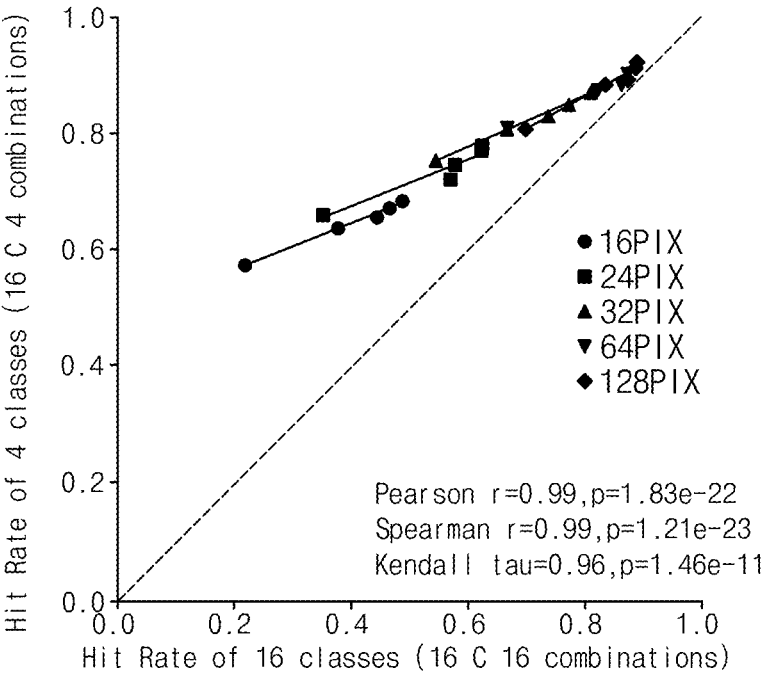
Figure 10F:
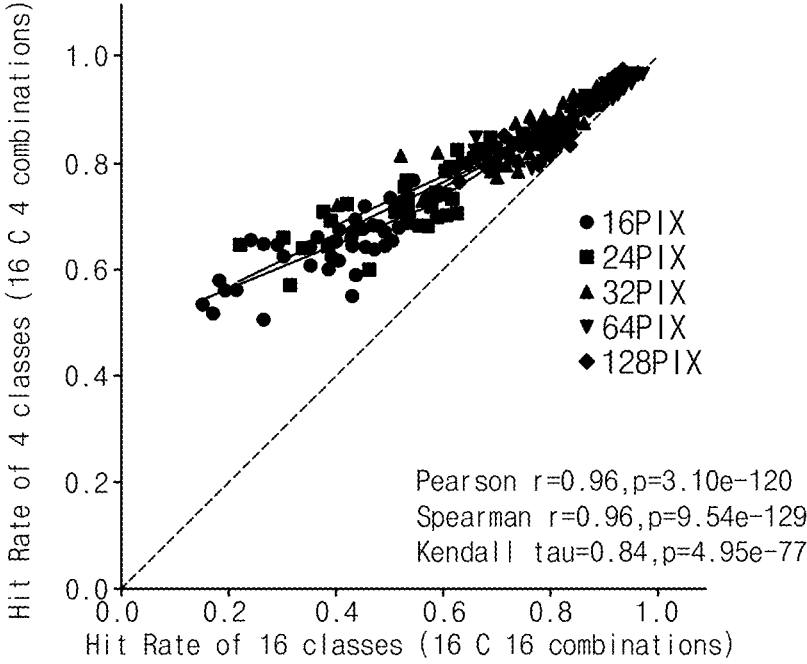
Figure 11A:
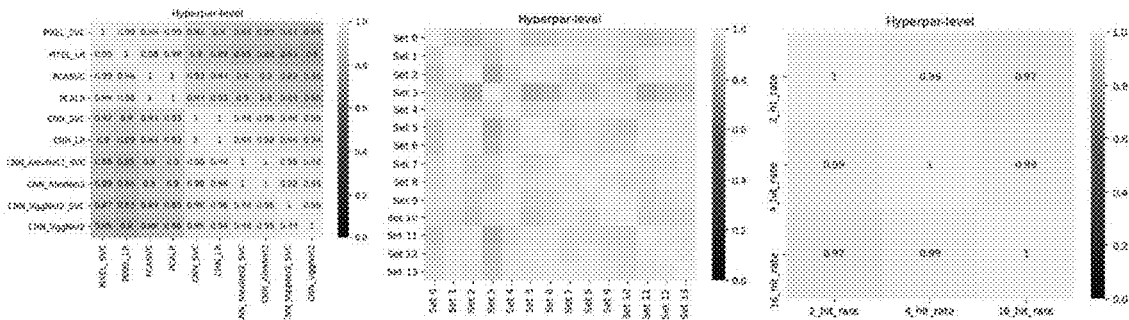
FIG. 11A and FIG. 11B are heatmap plots of performance correlations by type of machine learning models, sets, and facial class size performed in the learning module of FIG. 1.
Figure 11B:
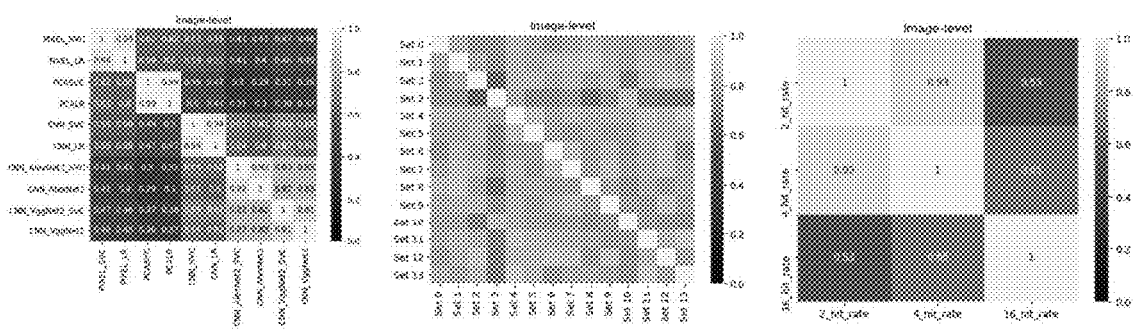

However, for each artificial vision parameter, the machine learning models with two different numbers of facial classes have high correlation coefficients (4 vs. 2 facial classes for FIG. 10A and FIG. 10B; 16 vs. 2 facial classes for FIG. 10C and FIG. 10D; and 16 vs. 4 facial classes for FIG. 10E and FIG. 10F). Here, the parameter means the facial expression, visual angle, brightness, or presence or absence of accessories per person's face in the dataset.

Figure 12:
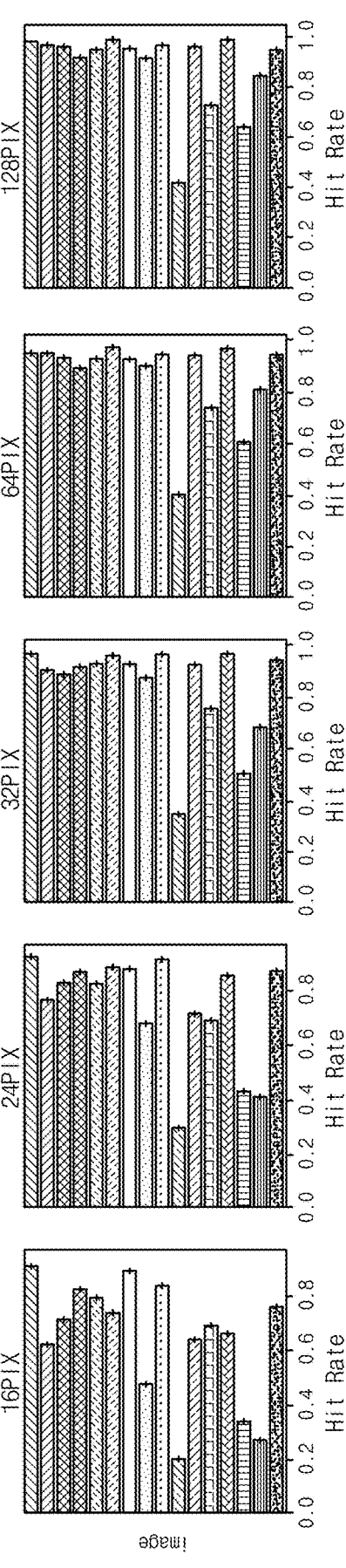
FIG. 12 illustrates resulting graphs which shows that the increasing effect is insignificant for certain facial classes even though the artificial vision parameter level increased by the number of pixels generated by the image processing module of FIG. 1.

FIG. 12 illustrates graphs that show that the increasing effect is insignificant for certain facial classes even though the artificial vision parameter level increased by the number of pixels generated by the image processing module of FIG. 1.

Referring to FIG. 12, it may be confirmed that the low performance of the model is not only due to the low-resolution levels but also due to a particularly challenging facial class (9th blue bar from the top in FIG. 12).

That is, to increase the performance of the model, it is necessary to find a challenging class in a relatively high-resolution level (e.g., 128 PIX) and to select a method such as data augmentation to increase the recognition accuracy (hit rate in the drawings) of the class with which the model is having a difficulty.

Figure 13A:
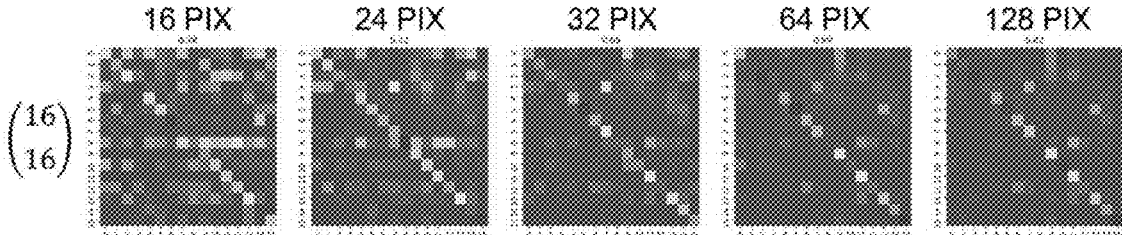
FIG. 13A and FIG. 13B are images illustrating that the higher the number of facial classes are selected from the same 16 class (FIG. 13A), the higher noise for each pixel dimension is (FIG. 13B)
Figure 13B:
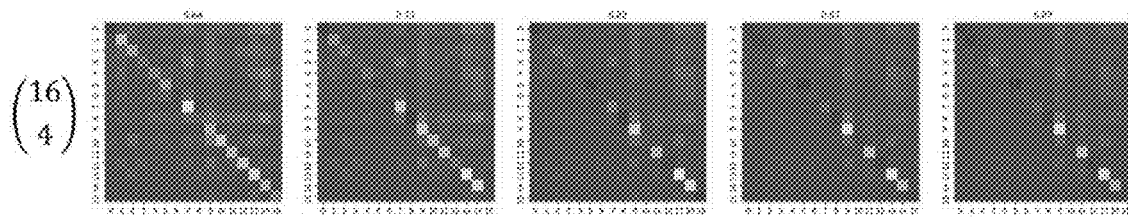
Figure 14A:
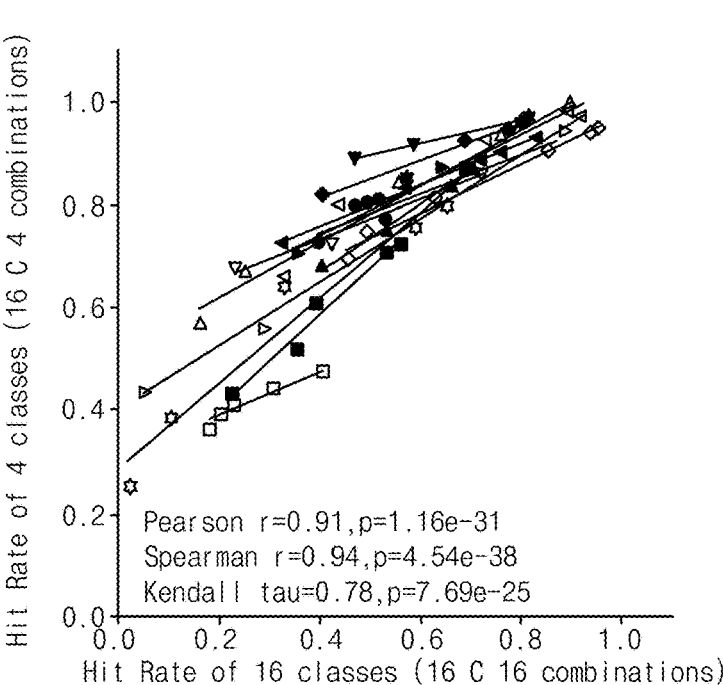
FIG. 14A, FIG. 14B, FIG. 14C and FIG. 14D are graphs showing the result that the correlation coefficient is high between the recognition accuracy (hit rate in the drawings) (hit rate) of the machine learning model with 4 facial classes and 16 and the linear regression line can be fitted well with high Pearson's correlation coefficient value.
Figure 14B:
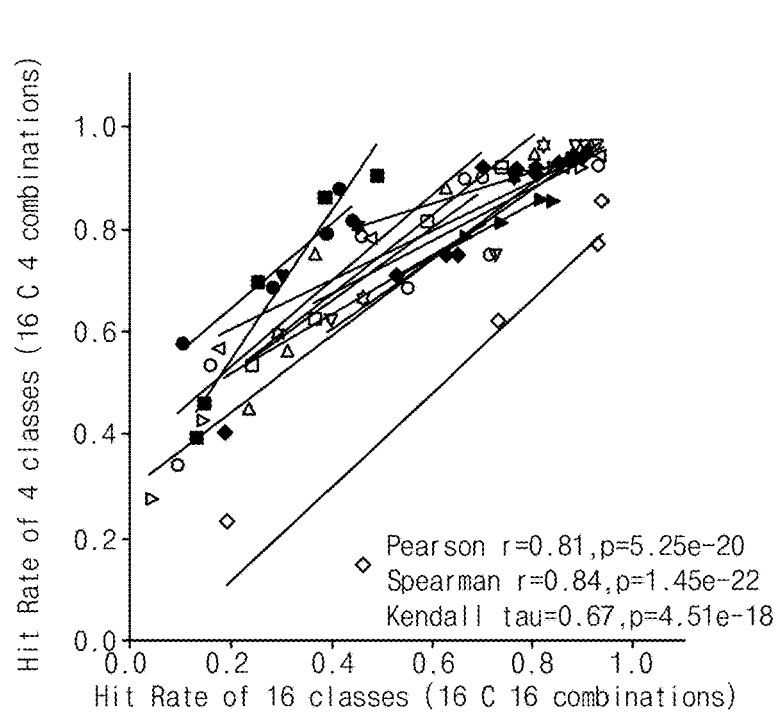
Figure 14C:
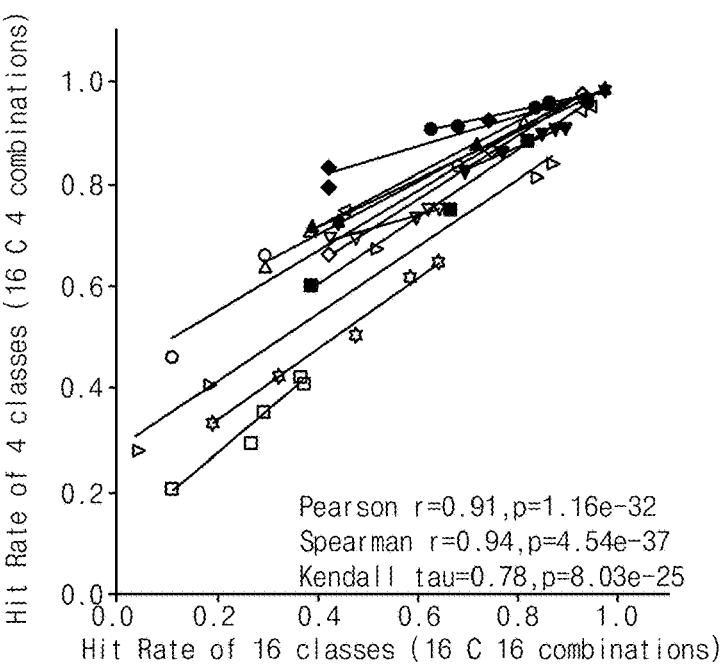
Figure 14D:
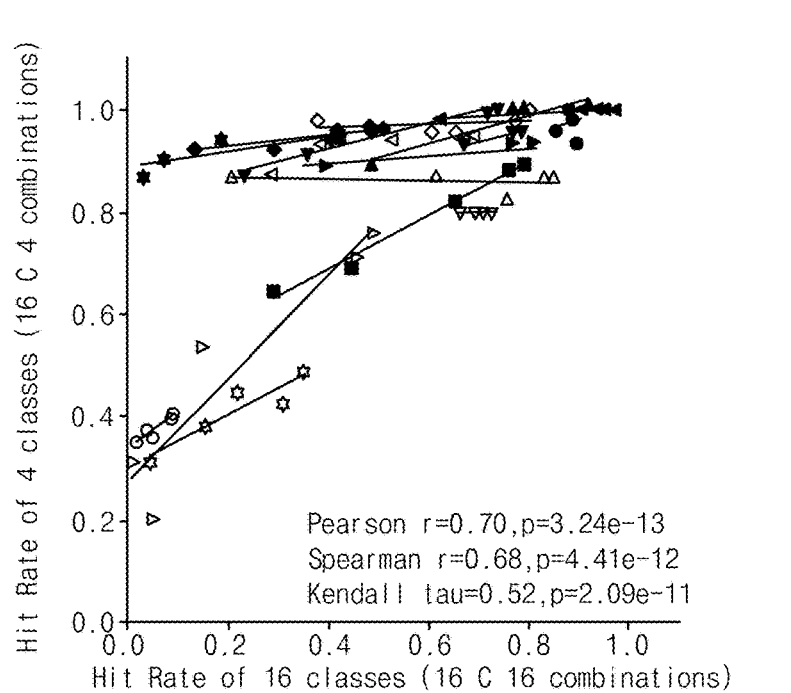

FIG. 13A and FIG. 13B are images illustrating that the higher the number of facial classes are selected from the same 16 class (FIG. 13A), the higher the noise is for each pixel dimension (FIG. 13B).

Referring to FIG. 13A and FIG. 13B, when the recognition accuracy (hit rate in the drawings) is compared between when the number of facial classes is large (16) and when the number is small (4), it may be visually confirmed that the former has higher noise than the latter for each pixel artificial vision parameter.

The previous study (Rajalingham et al., 2018, *J. Neurosci.*) conducted a binary recognition task for humans and monkeys and compared the performance of each image by classifying the model into 24 facial classes. This is a disadvantageous condition for the model in that the number of options is given differently compared to the human psychophysical experiment. Thus, in the present example embodiment, as illustrated in FIG. 13A and FIG. 13B, a heat map was derived considering all combinations of 16 facial classes and 4 of the 16 facial classes. Accordingly, it may be confirmed that the recognition accuracy (hit rate in the drawings) of the 4 facial classes in FIG. 13B is higher for all pixel dimensions (PIX) than the 16 facial classes in FIG. 13A.

FIG. 14A, FIG. 14B, FIG. 14C and FIG. 14D are graphs showing the result that the correlation coefficient is high between the recognition accuracy (hit rate in the drawings) (hit rate) of the machine learning model with 4 facial classes and 16 and the linear regression line can be fitted well with high Pearson's correlation coefficient value per each class.

In the case of FIG. 13A and FIG. 13B, information is given only for a specific model (CNN_SVC), but the result of comparing 16 C 16 and 16 C 4 for other models (PIXEL_SVC, PCASVC, CNN_AlexNet2_SVC) by extending this is shown in FIG. 14A through FIG. 14D.

Referring to FIG. 14A to FIG. 14D, for a specific face, regardless of whether the pixel dimension (PIX) is low or high, the average recognition performance is either high for certain facial classes (e.g., Face 19071131 in PIXEL_SVC) or low for other facial classes (e.g., Face 19081632 in PIXEL_SVC).

In addition, overall, when various correlation coefficients are calculated, the correlation coefficient of 16 C 4 performance compared to 16 C 16 performance is high for all models (e.g., Pearson's correlation coefficient is in the range of 0.7 to 0.91 in FIG. 13A and FIG. 13B), y-intercept is positive on average. In other words, even if the model is trained with a higher number of facial classes (e.g., 16) than the number of options (e.g., 2 or 4) frequently used in human psychophysical experiments based on the learning processing capability of the learning module 140, each performance may be predicted for a low number of facial classes in the model through linear mapping by class or overall.

Figure 15A:
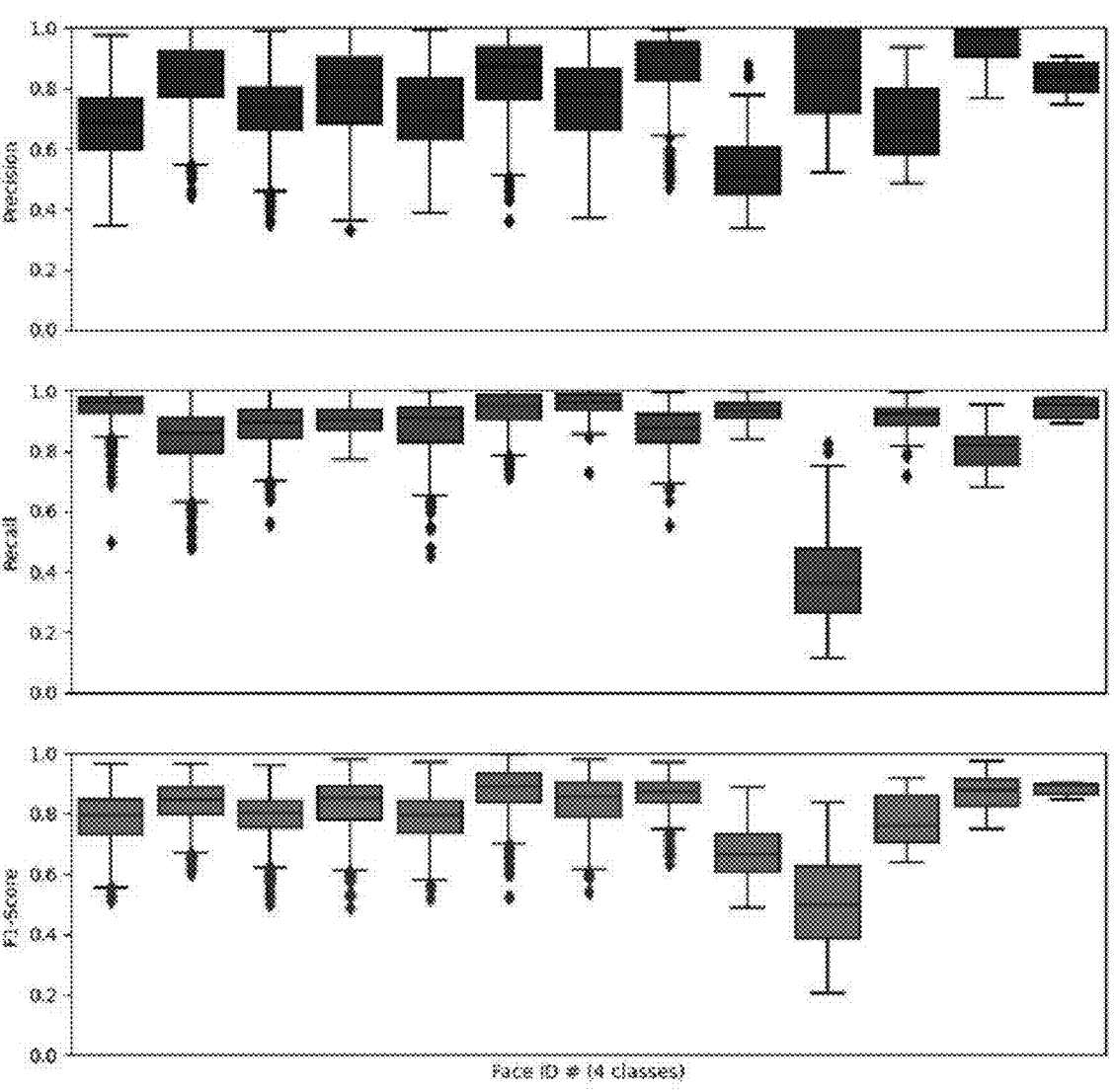
FIG. 15A and FIG. 15B are graphs showing precision, recall, and F1-score per class when the sample machine learning model is classified into 4 or 2 facial classes, respectively.
Figure 15B:
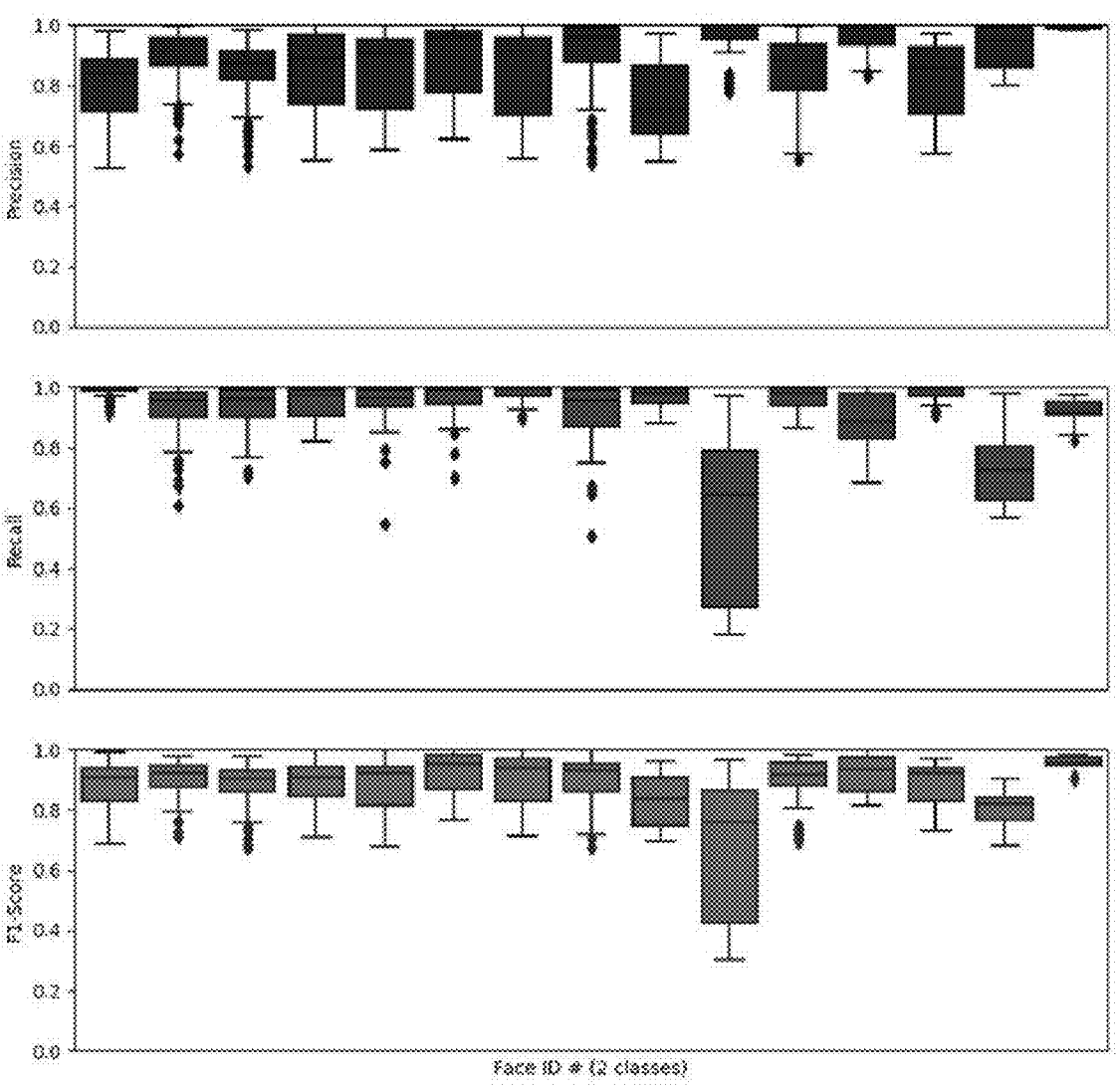

FIG. 15A and FIG. 15B are graphs showing precision, recall, and F1-score per class when the sample machine learning model is classified into 4 or 2 facial classes, respectively.

Referring to FIG. 15A and FIG. 15B, the third graph refers to the F1-score, which represents the harmonic average of the first graph, precision, and the second graph, Recall. In the case of a class with high recognition accuracy (hit rate in the drawings) based on the F1-score, each combination has a minor difference.

That is, it may be seen that a model with a large number of facial class size achieves high recognition accuracy (hit rate in the drawings), and it may be seen that in the case of facial classes where the recognition accuracy (hit rate in the drawings) is not high (the 10th class of F1-scores in FIG. 15A and the 10th class of F1-scores in FIG. 15B), the performance difference according to the combination is large.

Through this, the model always fits well regardless of the configuration of the next option for the class that fits well and indicates that the variation is large according to the configuration of the option next to the class that does not fit well.

Figure 16A:
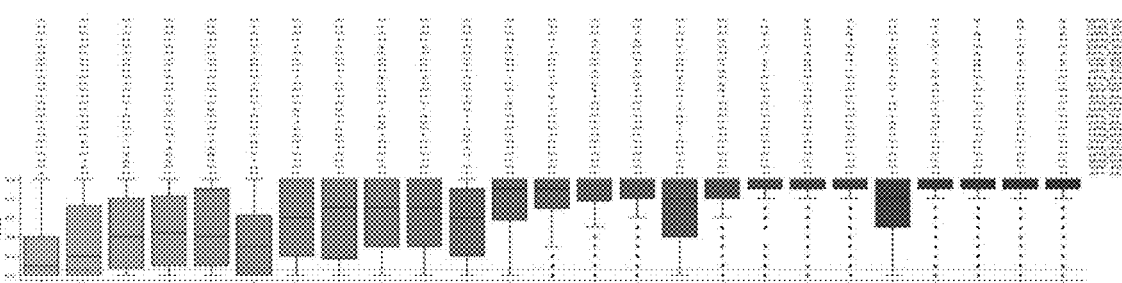
FIG. 16A and FIG. 16B are graphs for both optogenetic and electric versions, showing box plots of cognitive performances with respect to various parameters (resolutions, grayscale levels, viewpoint angles, and facial conditions), generated by the image processing module of FIG. 1.
Figure 16B:
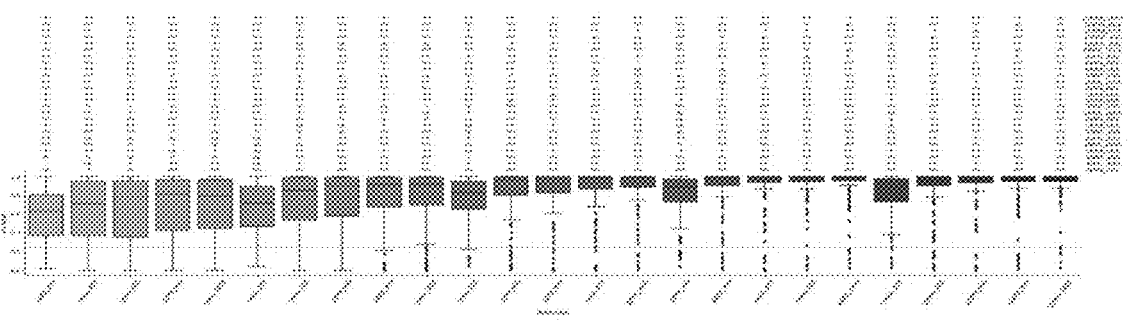
Figure 17A:
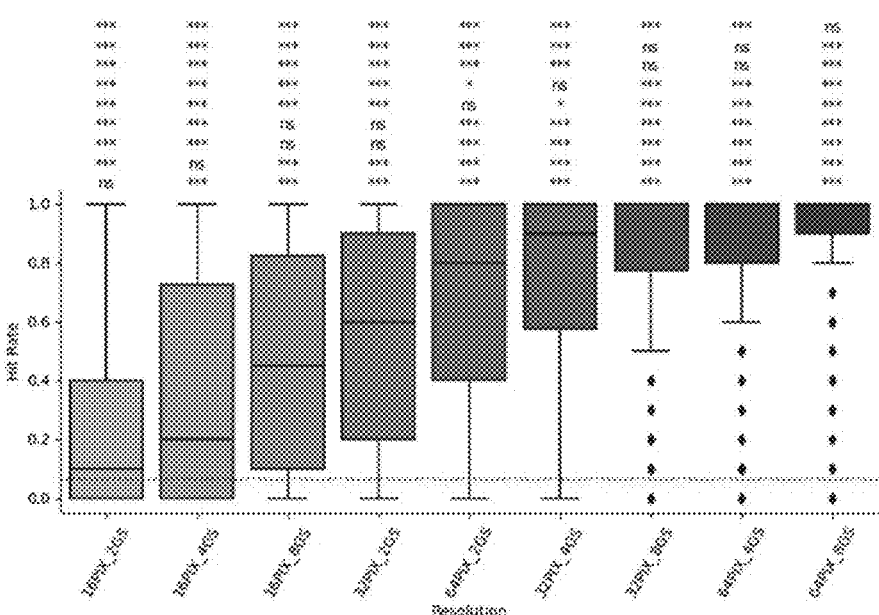
FIG. 17A and FIG. 17B are graphs for both optogenetic and electric versions, only containing crucial parameters selected by the automation system to be later used for a small-scale human psychophysical experiment, and they are subsets of FIG. 16A and FIG. 16B, respectively.
Figure 17B:
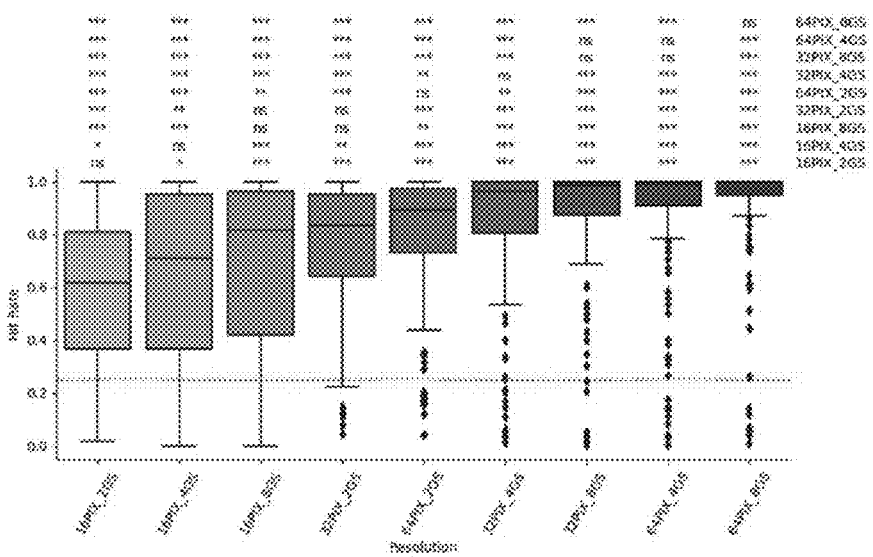

FIG. 16A and FIG. 16B are graphs for both optogenetic and electric versions, showing box plots of cognitive performances with respect to various artificial vision parameters (resolution and grayscale levels, viewpoint angles, and facial conditions), generated by the image processing module of FIG. 1; FIG. 17A and FIG. 17B are graphs for both optogenetic and electric versions, only containing crucial parameters selected by the automation system to be later used for a small-scale human psychophysical experiment, and they are subsets of FIG. 16A and FIG. 16B, respectively.

In general, human psychophysical experiments should be conducted to determine to what extent the performances of machine learning models match those of human subjects. However, conducting human psychophysical experiments for all artificial vision parameters is labor-intensive and time-consuming. In addition, if the subject is tested with numerous images as much as the machine learning model is tested on, it may induce memory effect, which is not the purpose of the cognitive experiment. Therefore, among myriad of artificial vision parameters, only the primary interested artificial vision parameters that are statistically significant are selected and used for human psychophysical experiments hereinafter. However, some artificial vision parameters such as 16 PIX_8 GS or 32 PIX_2 GS are both included even if the machine learning model shows no statistical difference to check whether it is also true for humans.

In the end, it is necessary to verify the degree of agreement with the machine learning model by checking the results for each artificial vision parameter of the learned results and conducting a small-scale human psychophysical experiment with the minimum cost as possible considering only the subset of artificial vision parameters.

To this end, in the present example embodiment, based on the results learned by the learning module 140, the test module 160 performs experiments on human subjects at a minimum cost, that is, with a relatively small number of images.

Therefore, to consider the artificial vision parameter of these subsets, based on the results of cognitive performance by artificial vision parameter of the model with the highest average recognition accuracy (hit rate in the drawings) as shown in FIG. 16A and FIG. 16B, parameters to be used in human psychophysical experiments may be selected like subsets as shown in FIG. 17.

As described above, the learning in the learning module 140 and the experiments for humans in the test module 160 are performed, and the experiment results in the test module 160 are fed back to the learning module 140 as shown in FIG. 1.

That is, the experimental results of the test module 160 are fed back to the learning processing part 140 are used in the learning module 140 for additional learning process and improvement of the facial identification (recognition and classification) task for machine learning models.

Furthermore, the automating and storing module 150 automatically selects and stores primary test images again based on the learned result according to the improved versions of machine learning models.

It is obvious that improvement of the machine learning models through such feedback mechanism may be repeatedly performed until the artificial vision parameters are optimized based on human results.

On the other hand, the learning module 140 compares facial class data that are particularly challenging for machine learning models in the learning module 140 and the test module 160, and the machine learning model may be improved, based on the experimental results in the test module 160.

In this case, when improving machine learning models, the learning module 140 may update parameters of the machine learning by performing an additional learning process only on a specific facial class through a data augmentation. For example, if a specific class achieved high recognition accuracy (hit rate in the drawings) in the human psychophysical experiment, but not in the machine learning result, the artificial vision parameters may be modified by the additional learning process for the specific facial class only through the data augmentation.

Alternatively, the learning module 140 calculates Pearson's correlation coefficient from the results of the learning module and the test module, and then the learning module 140 improves the performances of machine learning models by training to predict performances of human subjects on artificial vision parameters not tested in the experiment module, if it is determined that the correlation coefficient is high. Here, the artificial vision parameter indicates resolution and grayscale levels, or conditions (e.g., facial expression or visual angle) per image.

For example, in the learning module 140, all 16 PIX, 24 PIX, and 32 PIX have been measured, but only 16 PIX and 32 PIX are tested in the human psychophysical experiment of the test module 160 due to the time and cost limitations, hence, it is possible to calculate the estimation value of 24 PIX for human subjects based on the learned result of the machine learning models from the learning module 140 and the human psychophysical experiment result from the test module 160.

An automated learning system may be implemented by building an improved version of machine learning model in terms of recognition accuracy (hit rate in the drawings) through an additional learning in the learning module 140 as described above.

An artificial vision parameter automating method 100 includes taking the image from the sensory module 110, communicating with the sensory module 110 by the communication module 115, storing the taken image at the database 120, converting the selected image from the database into low-resolution phosphene images and generating the test images with various artificial vision parameters at the image processing module 130, building numerous machine learning models at the learning module 140, and automatically selecting and storing primary test data images, based on the learning at the automating and storing module 150.

Further, the system may further include conducting a human psychophysical experiment at the test module 160, and the human experiment results are fed back to the learning module 140 to improve the machine learning model performances at the learning module 140.

Here, the detailed explanation for the above process or step is explained above in detail and any repetitive explanations are omitted.

Further, in the image processing module 130, the image is cropped into a square shape to remove the background in the background removing module 131, gets uniformly distributed pixel values at the histogram equalization module 132, is divided into certain grayscale levels at the gray scaling module 133, and is pixelated and resized using the nearest neighbor interpolation at the pixelation module 134. Here, the detailed explanation for the above process or step is explained above in detail and repetitive explanations will be omitted.

According to the present example embodiments, instead of assessing the efficacy of visual prosthetic systems by only performing the conventional human psychophysical experiments, it is possible to estimate reasonable recognition accuracies of human subjects using machine learning models. Through the present example embodiments, crucial artificial vision parameters—the number of pixels and the grayscale levels are to be optimized in the automating and storing module. Here, further artificial vision parameters may exist, though not explained in the present example embodiments.

In addition, in the present example embodiments, Korean facial images were used to measure the cognitive ability of human subjects, but detection task may also be performed along with other types of visual stimuli (e.g., objects, animals, artificial backgrounds, and natural scenes).

In addition, in order to verify the performance of the machine learning model, only the primary test data is automatically selected with the automating method, and the selected data may be tested on normally-sighted human subjects or patients with implanted visual prosthetic systems. Thus, whenever a machine learning model that has a high correlation with human cognitive ability results is newly developed, a small-scale human psychophysical experiment may be additionally performed to verify the efficacy of the model.

Although the exemplary embodiments of the present invention have been described, it is understood that the present invention should not be limited to these exemplary embodiments, but various changes and modifications can be made by one ordinary skilled in the art within the spirit and scope of the present invention as hereinafter claimed.

What is claimed is:

1. An artificial vision parameter learning and automating system, comprising:

a sensor configured to take images;

a communicator configured to be communicated with the sensor;

a database configured to store the images received from the communicator;

an image processor configured to convert an image selected from the database into a low-resolution phosphene image, to generate test images with various artificial vision parameters;

a learning module configured to extract important features from a high-resolution training images, and to train numerous machine learning models to identify the visual stimuli from low-resolution phosphene images with a classifier based on the extracted features;

an automatic storer configured to automatically select and store primary test data, based on the learning performed by the learning module, and a tester configured to perform a human psychophysical experiment, wherein the learning module is configured to additionally learning of the machine learning model based on the small-scale human psychophysical experiment in the tester, wherein the automatic storer is configured to automatically select and store primary test data, based on the performance of machine learning models from the learning module.

2. The system of claim 1, wherein the tester is configured to perform the human psychophysical experiment a smaller number of test images compared to the number of test images tested by machine learning models.

3. The system of claim 2, wherein the learning module is configured to comparing the target class data that is particularly challenging for machine learning models to recognize in the learning module and the tester, and then to develop a new machine learning model based on the experimental results of human subjects from the tester.

4. The system of claim 3, wherein the learning module is configured to additionally train a machine learning model to make them learn particularly challenging through data augmentation to improve the performance of the model.

5. The system of claim 1, wherein the learning module is configured to draft a correlation deriver and then to calculate Pearson's correlation coefficient of cognitive performances based on the machine learning results of the learning module and the tester and if the calculated correlation coefficient is high enough, the machine learning model could make a reasonable prediction on recognition accuracies for artificial vision parameters that were not experimented in the tester.

6. The system of claim 1, wherein the sensor includes an image sensor or a camera device in visual prosthetic systems.

7. The system of claim 1, wherein the image processor further comprises:

a background remover configured to crop the image into a square shape and to remove a background;

a histogram equalizer configured to uniformly distributing pixel values of an image from which the background has been removed;

a gray scaler configured to divide grayscale levels for the image with uniformly distributed pixel values; and a pixelator configured to pixelize and resize the grayscaled image.

8. The system of claim 1, wherein the learning module comprises a trainer configured to train various machine learning models, wherein cognitive ability to recognize visual stimuli of the learning module is improved to follow the human recognition accuracies, through the trainer.

9. The system of claim 1, wherein the tester is configured to:

test a human subject on recognition ability of visual stimuli from the low-resolution phosphene images by selecting the identified faces from the high-resolution multiple-choice options on the subsequent screen.

10. The system of claim 1, wherein the learning module is configured to control the number of layers and the size of kernels (or filters) and to build an optimal machine learning model competent at identifying visual stimuli from the low-resolution phosphene images.

11. The system of claim 10, wherein the machine learning model can be any types of machine learning models such as CNN (Convolutional Neural Network) or RNN (Recurrent Neural Network).

* * * * *